(12) United States Patent
Park et al.

(10) Patent No.: US 11,996,646 B2
(45) Date of Patent: May 28, 2024

(54) CHARGING CONNECTOR FOR VEHICLE

(71) Applicant: YURA CO., LTD., Hwaseong-si (KR)

(72) Inventors: Soo Hwan Park, Incheon (KR); Na Young Kim, Seoul (KR)

(73) Assignee: YURA CO., LTD., Hwaseong-si (KR)

( * ) Notice: Subject to any disclaimer, the term of this patent is extended or adjusted under 35 U.S.C. 154(b) by 0 days.

(21) Appl. No.: 17/744,216

(22) Filed: May 13, 2022

(65) Prior Publication Data

US 2022/0376423 A1 Nov. 24, 2022

(30) Foreign Application Priority Data

May 18, 2021 (KR) .................. 10-2021-0064060

(51) Int. Cl.
*H01R 13/424* (2006.01)
*B60L 53/16* (2019.01)
*H01R 13/506* (2006.01)

(52) U.S. Cl.
CPC ............ *H01R 13/424* (2013.01); *B60L 53/16* (2019.02); *H01R 13/506* (2013.01); *H01R 2201/26* (2013.01)

(58) Field of Classification Search
CPC ............................ H01R 13/424; H01R 13/506; H01R 2201/26; B60L 53/16
See application file for complete search history.

(56) References Cited

U.S. PATENT DOCUMENTS

| 6,371,768 | B1 * | 4/2002 | Neblett | ................... | B60L 50/66 |
| | | | | | 439/34 |
| 7,878,866 | B1 * | 2/2011 | Kwasny | ............... | H01R 13/633 |
| | | | | | 439/923 |
| 2014/0113479 | A1 * | 4/2014 | Yoon | .................. | H01R 13/5205 |
| | | | | | 439/372 |
| 2015/0147918 | A1 | 5/2015 | Matsuda et al. | | |
| 2015/0318644 | A1 | 11/2015 | Ens et al. | | |

FOREIGN PATENT DOCUMENTS

| JP | H2-128380 | 10/1990 |
| JP | H4-284382 | 10/1992 |
| JP | H5-290918 | 11/1993 |
| JP | 2011-171166 | 9/2011 |
| JP | 2014-99256 | 5/2014 |
| JP | 2015-225771 | 12/2015 |
| JP | 2016-46219 | 4/2016 |
| KR | 2013-0022478 | 3/2013 |
| WO | 2012/175573 | 12/2012 |

* cited by examiner

*Primary Examiner* — Briggitte R. Hammond
(74) *Attorney, Agent, or Firm* — KILE PARK REED & HOUTTEMAN PLLC

(57) ABSTRACT

Provided is a charging connector for a vehicle, which is coupled to an inlet charging part of an electric vehicle. The charging connector includes a housing configured to provide a coupling space with the inlet charging part, an outlet terminal part including an outlet terminal disposed to pass through the coupling space so as to be in contact with an inlet terminal part installed inside the inlet charging part and a cable connected to the outlet terminal, and a rear holder assembled to one side of the housing to prevent the outlet terminal part from being separated. The rear holder includes a body disposed outside the coupling space and a prevention rib extending from the body to the inside of the coupling space and elastically deformed so that the outlet terminal is hooked and fixed to facilitate assembly of the charging connector for the vehicle and improve durability and safety.

4 Claims, 9 Drawing Sheets

CHARGING CONNECTOR FOR VEHICLE

CROSS-REFERENCE TO RELATED APPLICATIONS

This U.S. non-provisional patent application claims priority under 35 U.S.C. § 119 of Korean Patent Application No. 10-2021-0064060, filed on May 18, 2021, the entire contents of which are hereby incorporated by reference.

FIELD OF THE INVENTION

The present invention disclosed herein relates to a charging connector for a vehicle, and more particularly, to a charging connector for a vehicle, which is coupled to a charging inlet of an electric vehicle and used to charge the electric vehicle.

BACKGROUND ART

Recently, as environmental problems have become an issue, eco-friendly vehicles have been greatly emphasized to save energy and prevent environmental pollution. Thus, hydrogen fuel cell vehicles, biodiesel vehicles, and electric vehicles come into the spotlight as replacements for vehicles that receive driving power through an existing internal combustion engine.

Among them, the vehicle with the most active technology development means an electric vehicle, i.e., a vehicle using electricity as driving force. The electric vehicle is classified into an EV, a PHEV, and an HEV according to a method of using electric energy and a rate at which electricity is used as driving force, and each of the EV and PHEV is provided with a fast charging part and a slow charging part to receive power from the outside.

Here, since a high voltage is generated in the fast charging part and the slow charging part to charge the electric vehicle, there is a limitation, in which fixing force of a terminal part is lowered due to repeated detachment of a charging inlet part and the charging part of the vehicle to deteriorate electrical safety, and also, there is a limitation, in which workability and productivity are deteriorated so as to install an outlet terminal at a correct position.

SUMMARY OF THE INVENTION

To solve the above-mentioned limitations, the present invention provides a charging connector for a vehicle, in which a charging terminal installed inside the charging connector for the vehicle is easily installed and also is stably fixed to improve product durability and safety.

The present invention provides a charging connector for a vehicle, which is coupled to an inlet charging part of an electric vehicle, the charging connector including: a housing configured to provide a coupling space with the inlet charging part; an outlet terminal part including an outlet terminal disposed inside the coupling space so as to be in contact with an inlet terminal part installed inside the inlet charging part and a cable connected to the outlet terminal; and a rear holder assembled to one side of the housing to prevent the outlet terminal part from being separated, wherein the rear holder includes: a body disposed one side of the housing; and a prevention rib extending from the body to the inside of the housing and elastically deformed so that the outlet terminal is hooked and fixed.

The prevention rib may be cut in a coupling direction, in which the outlet terminal part extends, and be elastically deformed in a radial direction to return to its original position after the outlet terminal passes so that an end of the outlet terminal is supported.

The prevention rib may include first and second prevention ribs facing each other, wherein a cross-sectional area of a second connection hole defined by the first and second prevention ribs may be gradually reduced as being away from the body.

The housing may have a support surface through which the coupling space and an accommodation space closed by the rear holder are partitioned, and the outlet terminal may include a support end, which protrudes along an outer circumferential surface so as to be supported on each of the support surface and the prevention ribs, at a distal end of one side thereof.

The housing may have a coupling hole recessed from the accommodation space, and the rear holder may include a coupling rib extending from the body to the inside of the accommodation space so as to be hooked and fixed to the coupling hole.

BRIEF DESCRIPTION OF THE DRAWINGS

The accompanying drawings are included to provide a further understanding of the present invention, and are incorporated in and constitute a part of this specification. The drawings illustrate exemplary embodiments of the present invention and, together with the description, serve to explain principles of the present invention. In the drawings:

FIG. 2 is a perspective view illustrating a state in which a grip part is excluded in

FIG. 1;

DETAILED DESCRIPTION OF THE PREFERRED EMBODIMENTS

Hereinafter, specific embodiments of the present invention will be described in detail with reference to the accompanying drawings. However, detailed descriptions of well-known functions or configurations are omitted so as not to obscure the gist of the present invention.

In addition, for convenience of description, a direction in which an inlet charging part and a charging connector for a vehicle are coupled to each other is defined as a coupling direction, and a direction crossing the coupling direction is defined as a radial direction.

Figure 1:
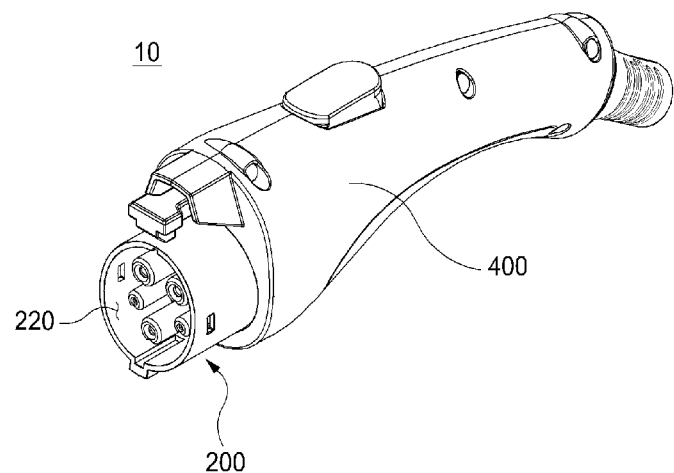
FIG. 1 is a perspective view of a charging outlet according to an embodiment of the present invention.
Figure 2:
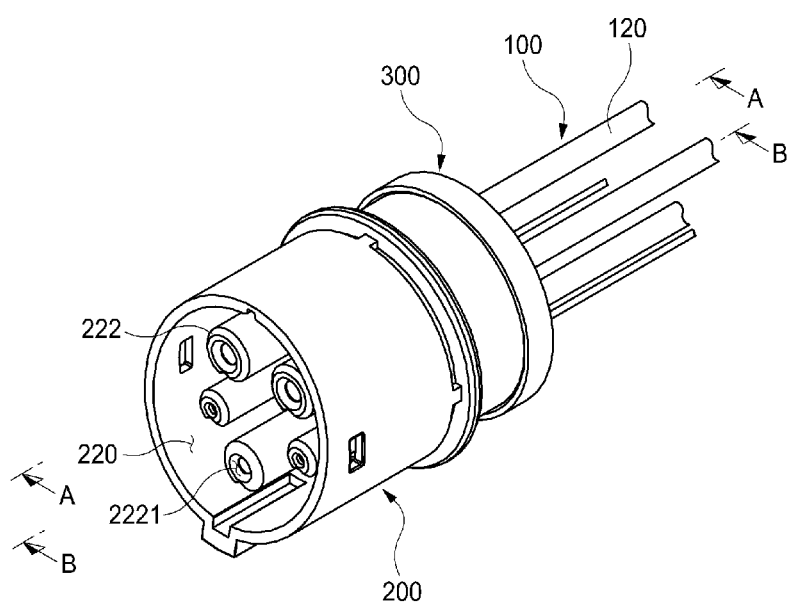
Figure 3:
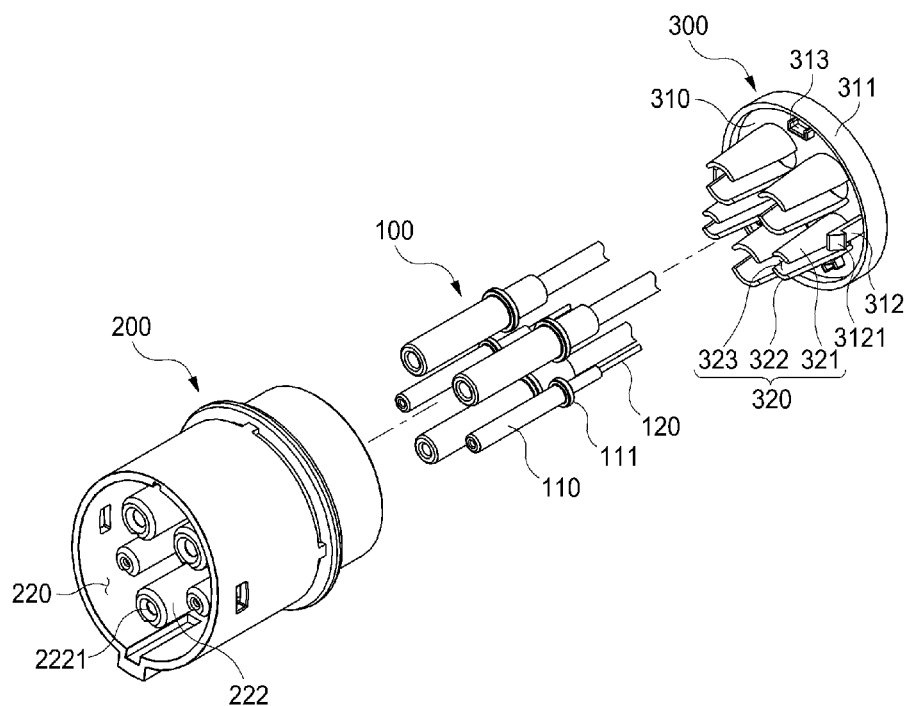
FIG. 3 is an exploded perspective view of FIG. 2.
Figure 4:
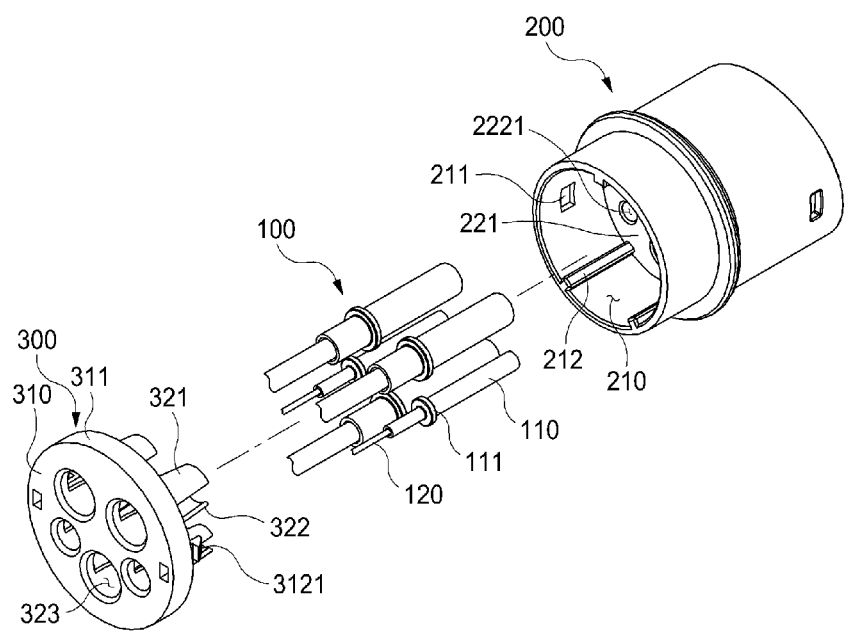
FIG. 4 is a perspective view illustrating a different direction of FIG. 3.
Figure 5:
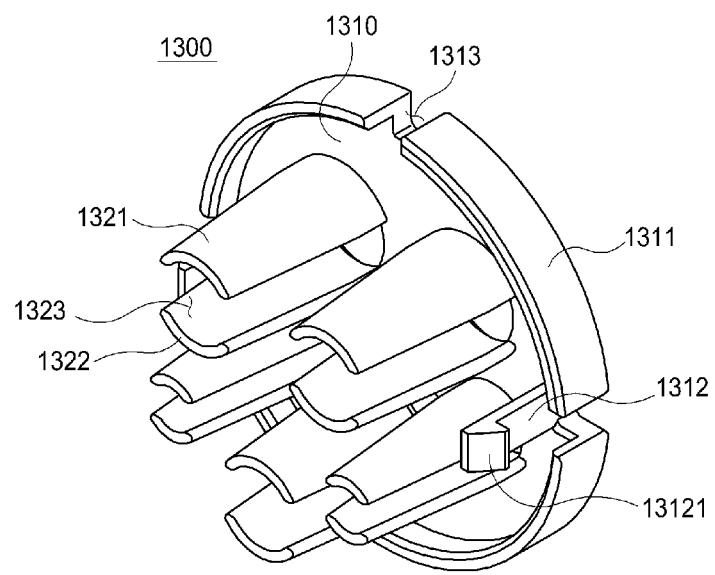
FIG. 5 is a perspective view of a rear holder of FIG. 4 according to another embodiment.
Figure 6:
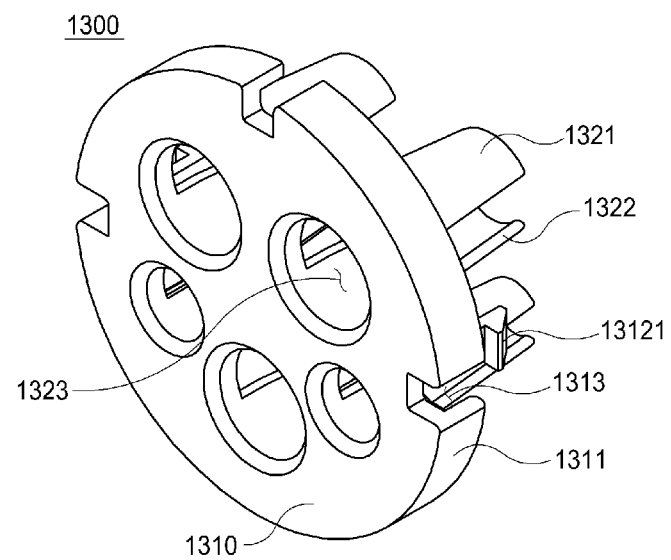
FIG. 6 is a perspective view illustrating a different direction of FIG. 5.
Figure 7:
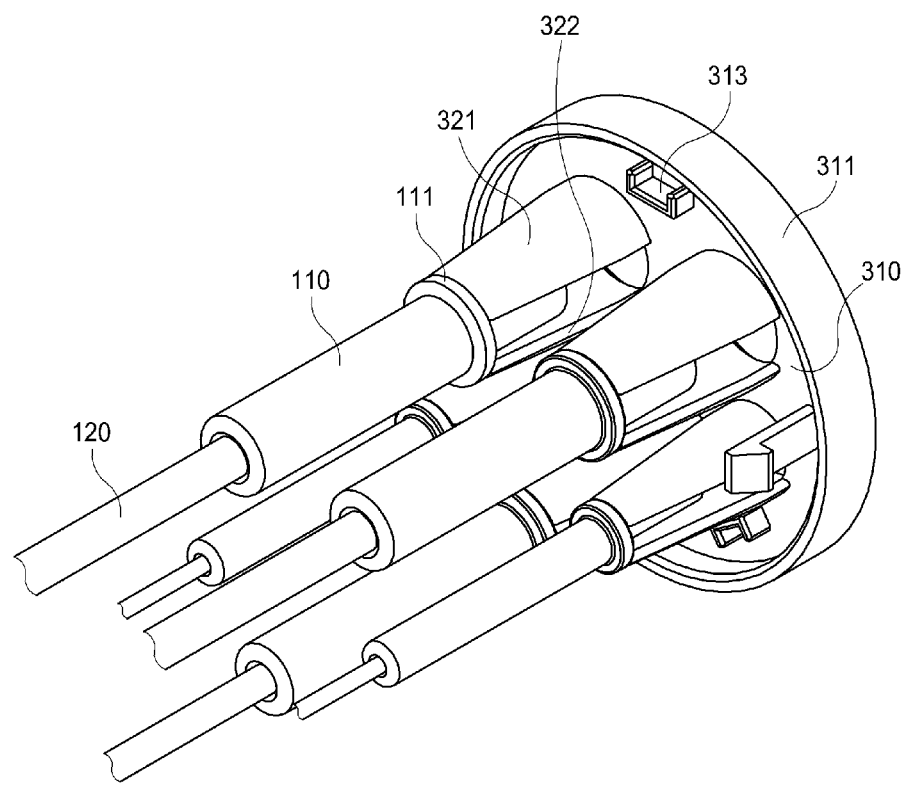
FIG. 7 is a perspective view of an outlet terminal of FIG. 3.
Figure 8A:
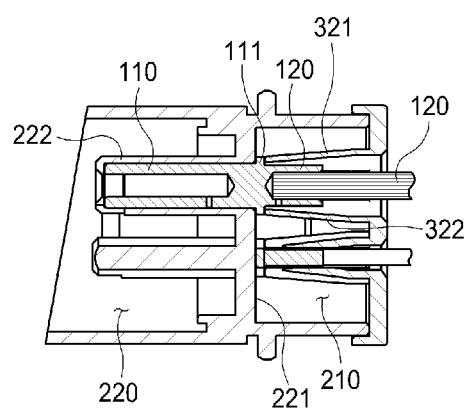
FIG. 8A is a cross-sectional view taken along line A-A of FIG. 2.
Figure 8B:
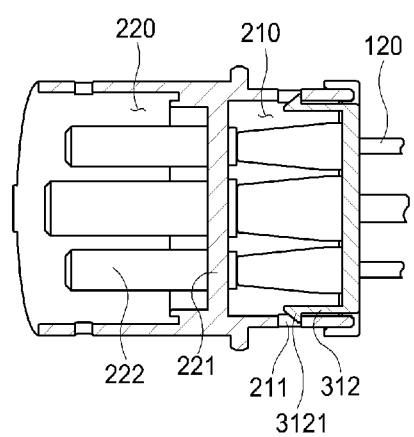
FIG. 8B is a cross-sectional view taken along line B-B of FIG. 2.
Figure 9:
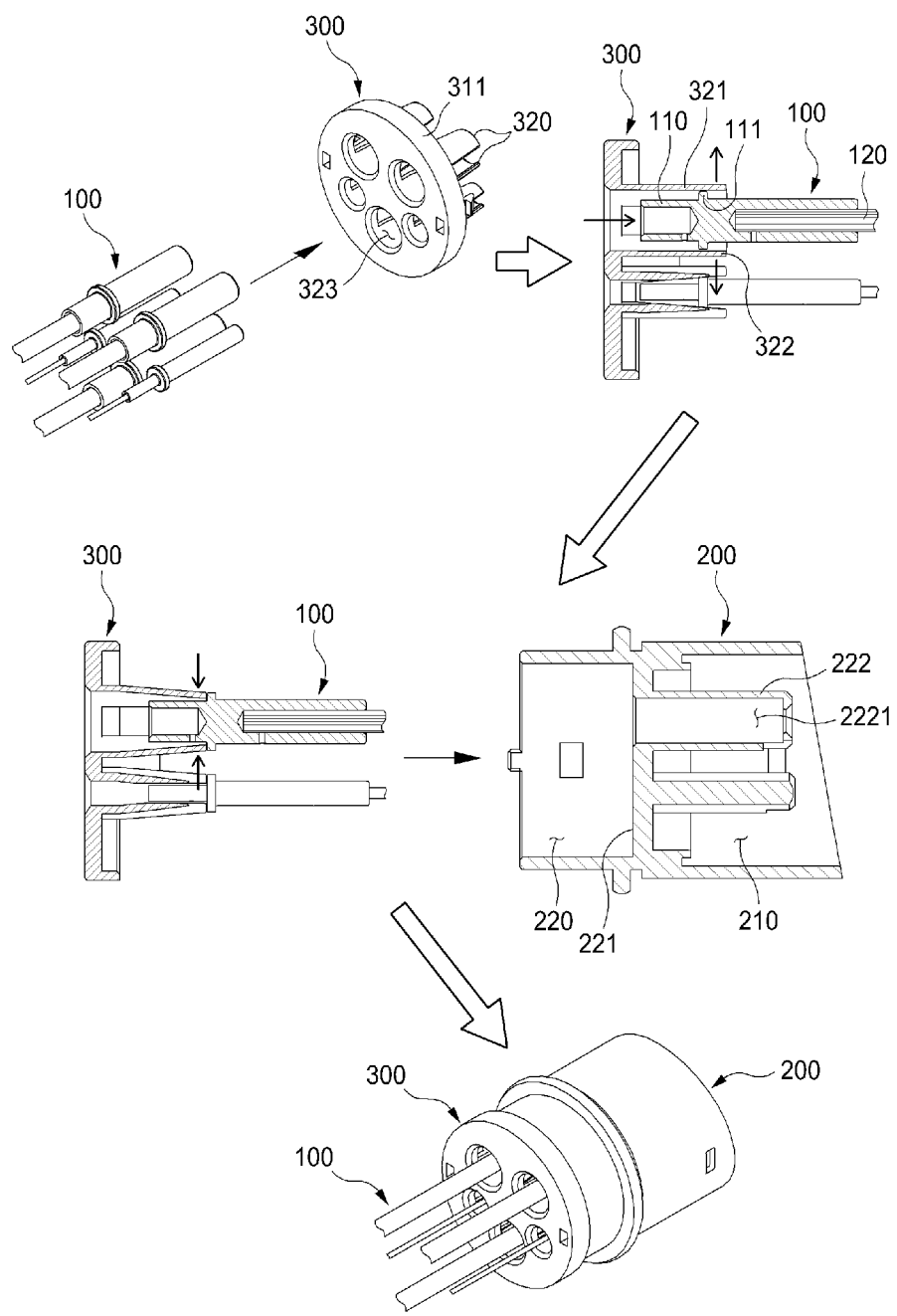
FIG. 9 is a view illustrating a method for coupling an outlet terminal to a rear holder.

FIG. 1 is a perspective view of a charging outlet according to an embodiment of the present invention, FIG. 2 is a perspective view illustrating a state in which a grip part is excluded in FIG. 1, FIG. 3 is an exploded perspective view of FIG. 2, FIG. 4 is a perspective view illustrating a different direction of FIG. 3, FIG. 5 is a perspective view of a rear holder of FIG. 4 according to another embodiment, FIG. 6 is a perspective view illustrating a different direction of FIG. 5, FIG. 7 is a perspective view of an outlet terminal of FIG. 3, FIG. 8A is a cross-sectional view taken along line A-A of FIG. 2, FIG. 8B is a cross-sectional view taken along line B-B of FIG. 2, and FIG. 9 is a view illustrating a method for coupling an outlet terminal to a rear holder.

Referring to FIGS. 1 to 9, a charging connector for a vehicle, which is coupled to an inlet charging part of an electric vehicle of the present invention, includes a housing providing a coupling space with the inlet charging part, an outlet terminal part including an outlet terminal disposed inside the coupling space so as to be in contact with an inlet terminal part installed inside the inlet charging part and a cable connected to the outlet terminal, and a rear holder assembled to one side of the housing to prevent the outlet terminal part from being separated. The rear holder is provided with a body disposed one side of the housing and a prevention rib extending from the body to the inside of the housing and elastically deformed so that the outlet terminal is hooked and fixed.

The charging connector 10 for the vehicle is connected to an external device and coupled to the inlet charging part provided in the electric vehicle to supply external power, thereby charging a battery. Here, the charging connector is connected so that the inlet terminal part, which is installed inside the inlet charging part, and the outlet terminal part 100 are stably connected to each other.

The outlet terminal part 100 is provided with the plurality of charging terminals 110 coupled to the inlet terminal part and a wire 120 extending to one side of the charging terminal 110 and is installed to pass through the housing 200. The outlet terminal part 100 has one side connected to an external device through a wire and the other side that is in contact with the inlet terminal part installed inside the inlet charging part to realize electrical connection when the vehicle is charged.

The charging terminal 110 passes through a first connection hole 2221 so as to be disposed over the coupling space 220 and the accommodation space 210 so that one end disposed in the accommodation space 210 is disposed inside the housing 200 and electrically connected to the external power source through the wire, and the other end is disposed inside the coupling space 220 and electrically connected to the inlet terminal part. Here, the plurality of charging terminals 110 are respectively installed at pre-designed positions and integrally connected to the inlet terminal part.

At this time, the charging terminal 110 protrudes along an outer circumferential surface to provide a support end 111 disposed between a support surface 221 and a prevention rib 320, thereby preventing the charging terminal 110 from being unintentionally separated from a rear holder 300, and also, the charging terminal 110 is disposed at a specific position inside an extension part 222 so that the inlet terminal part and the outlet terminal part 100 are in contact with each other at a pre-designed position.

Thus, the charging connector 10 of the present invention further improves stability of the electrical connection and allows the charging terminal to be stably fixed even with repeated detachment from the inlet charging part to improve durability of a product and safety against a high voltage generated during charging.

The housing 200 has a coupling space 220, in which one end of the outlet terminal part 100 is accommodated, at one side thereof and an accommodation space 210, in which the other end of the outlet terminal part 100 is accommodated, at the other side thereof. The coupling space 220 and the accommodation space 210 is installed to be divided by the support surface 221 that is in contact with the support end 111 so that the portion connected to the external device and the device connected to the inlet charging part are divided into each other.

Here, the first connection hole 2221 through which each of the charging terminals 110 passes is defined in the support surface 221 so that each of the plurality of charging terminals 110 has a pre-designed pattern. In this case, the first connection hole 2221 has a size less than that of the support end 111 so that the support end 111 is supported on the support surface 221.

In addition, a coupling hole 211, to which the rear holder 300 is coupled, and a guide protrusion 212 that guides the coupling position of the rear holder 300 are provided inside the accommodation space 210 so that the rear holder 300 is easily coupled in a snap-fit manner, and also, the plurality of charging terminals 110, which are primarily fixed to the rear holder 300, are integrally disposed at designated positions, thereby preventing the inlet charging part and the charging connector 10 for the vehicle from being erroneously coupled to each other.

Here, the coupling hole 211 may be provided in at least a pair to face each other. The guide protrusion 212 may be provided in three pieces that are spaced regular intervals from each other, and the charging terminal 110 may extend in the coupling direction and be disposed at a correct position without vertical inversion. In addition, the guide groove 313 defined in the rear holder 300 may move along the guide protrusion 212 so that the guide protrusion 214 is easily coupled.

In addition, when the guide protrusion 212 is provided in plurality, when the inlet charging part and the charging connector 10 for the vehicle are detached from each other, rotation force occurring with respect to a central axis of the housing 200 may be offset to minimize deformation, damage, and the like, which may occur in the inlet terminal part and the outlet terminal part 100.

Rear holders 300 and 1300 are provided with bodies 310 and 1310 disposed at one side of the accommodation space 210 and prevention ribs 320 and 1320, in which second connection holes 323 and 1323 respectively extending from the bodies 310 and 1310 to communicate with the first connection hole 2221 is defined. Thus, the rear holder 300 is disposed outside an opened surface of the accommodation space 210 to protect the charging terminal 110 disposed in the accommodation space 210 and also is disposed to face the support surface 221 to more firmly fix the charging terminal 110.

The bodies 310 and 1310 are disposed outside the opened surface of the accommodation space 210 and extends along an outer circumferential surface in the coupling direction to provide protection ribs 311 and 1311 outside the accommodation space 210, thereby protecting the distal end of the housing 200 and also extends in the coupling direction to provide coupling ribs 312 and 1312 inside the accommodation space 210 so that the rear holders 300 and 1300 are easily coupled and fixed to the housing 200.

Here, coupling protrusions 3121 and 13121 hooked and fixed to the coupling hole 211 are respectively disposed on distal ends of the coupling ribs 312 and 1312, and a coupling hole 211 of each of the coupling protrusions 3121 and 13121 is hooked and fixed inside the accommodation space 210 to prevent the coupling structure from being exposed to the outside.

Thus, the coupling portion is prevented from being damaged by worker's carelessness during the production process or from being damaged by vibration or external force generated during vehicle operation, thereby improving durability of the product and securing electrical safety.

In addition, guide grooves 313 and 1313 are defined at sides of the bodies 310 and 1310 to correspond to the guide protrusion 212 so that the rear holders 300 and 1300 and the housing 200 are easily coupled to each other and also is hooked and fixed to the guide protrusion 214 to offset the rotation force, thereby minimizing the damage of the charging terminal 110.

Here, as illustrated in FIGS. 3 and 4, in the rear holder 300 according to an embodiment, the coupling rib 312 and the guide groove 313 may be provided at different positions of the body 310. However, as illustrated in FIGS. 5 and 6, in the rear holder 1300 according to another embodiment, the coupling rib 1312 extends from one side of the guide groove 1313 so that the position of the coupling rib 1312 is confirmed from the outside with the naked eye, and thus, release of the rear holder 1300 is more easy.

The prevention ribs 320 and 1320 respectively extend from one side of the bodies 310 and 1310 in the extension direction of the accommodation space 210. Here, the second connection holes 323 and 1323 having the same pattern as the first connection hole 2221 are defined inside the prevention ribs 320 and 1320 so that the outlet terminal part 100 primarily fixed to the rear holders 300 and 1300 are integrally coupled to the housing 200.

Here, the prevention ribs 320 and 1320 are cut in the coupling direction to form a pair of first prevention ribs 321 and 1321 and second prevention ribs 322 and 1322 and are elastically deformed in the radial direction. Thus, when the charging terminal 110 is inserted, the protruding support end 111 smoothly passes through the second connection holes 323 and 1323, and after the passing through the second connection holes 323 and 1323, the first prevention ribs 321 and 1321 and the second prevention ribs 322 and 1322 return to their original positions by elastic restoring force so that the support end 111 is hooked to fix the charging terminal 110.

In addition, a degree of the cutting or the number of times of the cutting of each of the prevent ribs 320 and 1320 may vary according to a design. Thus, the degree and the number of times of the cutting are adjusted to control insertion/extraction of the charging terminal 110, thereby improving the workability. Here, this corresponds to a matter obvious by the present invention.

In addition, the first prevention ribs 321 and 1321 and the second prevention ribs 322 and 1322 face each other to extend in the coupling direction, thereby providing second connection holes 323 and 1323 passing through the rear holders 300 and 1300. Thus, each of the charging terminals 110 may be fixed between the first prevention ribs 321 and 1321 and the second prevention ribs 322 and 1322, and also, for the more stable fixing force, each of the second connection holes 323 and 1323 may have a cross-sectional area that is gradually reduced as being away from the bodies 310 and 1310.

Therefore, in the charging connector 10 for the vehicle according to the present invention, the plurality of charging terminals 110 are inserted into the rear holder 300 to primarily fix the charging terminals 110, and also, the charging terminals 110 and the rear holder 300 are integrally coupled to the housing 200 to simplify the production process, thereby improving the productivity.

In addition, the various structures for facilitating the coupling of the charging terminal 110 and preventing the charging terminal 110 from moving are provided to secure the stability and reliability of the charting connector 10 for the vehicle with the inlet charging part. Also, when repeatedly detached, the damage that may occur in the charging connector 10 for the vehicle, is minimized, and also, the fixing force is prevented from being reduced to improve the durability and the stability.

As described above, various effects including the following facts may be expected according to the technical problems of the present invention. However, the present invention is unnecessary to allow all of the following effects to be exerted.

The charging connector of the present invention may be assembled to the housing in the state in which the plurality of charging terminals are installed in the rear holder to simplify the production process and improve the product productivity by reducing the worker fatigue.

In addition, the prevention rib of the rear holder may be cut in the coupling direction so that the plurality of charging terminals are easily coupled, and also, the charging terminal protrudes by the pre-designed length in the coupling space to improve the electrical stability with the inlet terminal part.

In addition, the coupling rib hooked and fixed to the housing may be provided on the rear holder and coupled in the snap-fit manner so that the worker easily fixes the rear holder to the housing without performing the separate process, and the guide protrusion protruding to guide the installation position of the rear holder may be disposed in the accommodation space to maximize the effect of improving the product productivity.

Although the exemplary embodiment of the present invention is illustratively described, the technical scope of the present invention is not limited to only the specific embodiment, and thus all suitable modifications and equivalents coming with the scope of the appended claims.

What is claimed is:

1. A charging connector for a vehicle, which is coupled to an inlet charging part of an electric vehicle, the charging connector comprising:
    a housing configured to provide a coupling space with the inlet charging part at one side and, to provide an accommodation space at another side;
    an outlet terminal part comprising an outlet terminal disposed to pass through the accommodation space so as to be in contact with an inlet terminal part installed inside the inlet charging part and a cable connected to the outlet terminal; and
    a rear holder to prevent the outlet terminal part from being separated,
    wherein the rear holder comprises:
        a body disposed outside the accommodation space; and
        a prevention rib extending from the body to inside of the accommodation space and elastically deformed,
    wherein the accommodation space inwardly has a coupling hole to which the rear holder is coupled and a plurality of guide protrusion that guides a coupling position of the rear holder, and
    wherein the body has a plurality of guide grooves to correspond to the guide protrusion and a coupling rib extends from one side of the guide groove to the inside of the accommodation space to be hooked and fixed to the coupling hole.

2. The charging connector of claim 1, wherein the prevention rib is cut in a coupling direction, in which the outlet terminal part extends, and is elastically deformed in a radial direction to return to the prevention rib's original position after the outlet terminal passes so that an end of the outlet terminal is supported.

3. The charging connector of claim 2, wherein the housing has a first connection hole through which each of the plurality of charging terminals passes so that the each of the plurality of charging terminals has a pre-designed pattern
wherein the prevention rib comprises first and second prevention ribs facing each other so that define a second connection hole to communicate with the first connection hole,
wherein a cross-sectional area of the second connection hole is gradually reduced as being away from the body.

4. The charging connector of claim 2, wherein the housing has a support surface through which the coupling space and the accommodation space closed by the rear holder are partitioned, and
the outlet terminal comprises a support end, which protrudes along an outer circumferential surface so as to be supported on each of the support surface and the prevention ribs, at a distal end of one side thereof.

\* \* \* \* \*